(12) United States Patent
Tasaka

(10) Patent No.: US 8,194,515 B2
(45) Date of Patent: Jun. 5, 2012

(54) INFORMATION RECORDING MEDIUM AND RECORDING AND/OR REPRODUCING APPARATUS AND METHOD

(75) Inventor: Shuichi Tasaka, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 16 days.

(21) Appl. No.: 12/349,737

(22) Filed: Jan. 7, 2009

(65) Prior Publication Data

US 2009/0122672 A1 May 14, 2009

Related U.S. Application Data

(63) Continuation of application No. 11/738,077, filed on Apr. 20, 2007.

(30) Foreign Application Priority Data

Sep. 4, 2006 (KR) .............................. 2006-0084832
Dec. 6, 2006 (KR) .............................. 2006-0123384

(51) Int. Cl.
*G11B 19/04* (2006.01)
(52) U.S. Cl. .................. 369/53.2; 369/53.21; 369/59.23
(58) Field of Classification Search ................ 369/53.2, 369/53.21, 59.23, 47.21, 47.22, 47.27, 47.15, 369/53.31, 30.04, 30.05, 30.07, 30.09, 59.25
See application file for complete search history.

(56) References Cited

U.S. PATENT DOCUMENTS

| | | | |
|---|---|---|---|
| 6,678,236 B1 * | 1/2004 | Ueki ........................ | 369/30.04 |
| 7,430,157 B2 | 9/2008 | Nishino et al. | |
| 2003/0039187 A1 | 2/2003 | Geutskens | |
| 2003/0067859 A1 | 4/2003 | Weijenbergh et al. | |
| 2003/0223339 A1 * | 12/2003 | Taniguchi et al. ......... | 369/53.22 |
| 2003/0231869 A1 * | 12/2003 | Kitani ........................... | 386/94 |
| 2004/0071068 A1 | 4/2004 | Lee et al. | |
| 2005/0025015 A1 | 2/2005 | Horibata | |
| 2005/0105421 A1 | 5/2005 | Nijboer et al. | |
| 2005/0154682 A1 * | 7/2005 | Taylor ............................ | 705/71 |
| 2006/0126471 A1 * | 6/2006 | Tomonari et al. ............ | 369/53.2 |
| 2006/0256675 A1 | 11/2006 | Nishino et al. | |
| 2007/0195667 A1 * | 8/2007 | Ishida ......................... | 369/53.2 |
| 2008/0279085 A1 * | 11/2008 | Yashima et al. ............ | 369/275.3 |

FOREIGN PATENT DOCUMENTS

| | | |
|---|---|---|
| EP | 1703498 | 9/2006 |
| EP | 2001024 | 12/2008 |
| EP | 2048662 | 4/2009 |
| TW | I256039 | 6/2006 |
| TW | I256041 | 6/2006 |

(Continued)

OTHER PUBLICATIONS

European Search Report issued Oct. 19, 2009 in EP Application No. 07793658.1.

(Continued)

*Primary Examiner* — Thang Tran
(74) *Attorney, Agent, or Firm* — Stanzione & Kim, LLP

(57) ABSTRACT

An information recording medium and a recording and/or reproducing apparatus and method used to guarantee reproduction compatibility in consideration of the fact that content distribution may be performed according to various business models includes a management information zone in which management information is recorded, wherein the management information indicates an intended type of use of the information recording medium.

14 Claims, 10 Drawing Sheets

INFORMATION RECORDING MEDIUM

FOREIGN PATENT DOCUMENTS

WO 2005/059904 6/2005

OTHER PUBLICATIONS

Anonymous: "Issuance of DVD Download Disc for CSS Managed Recording Specifications" Internet Article, [Online] Mar. 1, 2007, XP002536682 Retrieved from the Internet: URL:http://www.dvdfllc.co.jp/f_dvddownload0703.htm> [retrieved on Jul. 13, 2009].

PCT International Search Report and Written Opinion issued in corresponding PCT International Application No. PCT/KR2007/004055 dated Nov. 28, 2007.

U.S. Appl. No. 11/738,077, filed Apr. 20, 2007, Shuichi Tasaka, Samsung Electronics Co., Ltd.

Taiwan Office Action issued Dec. 14, 2010 in TW Application No. 096118176.

Taiwan Office Action issued Jul. 11, 2011 in Taiwan Patent Application No. 96118176.

Decision to Refuse issued Nov. 24, 2011 in EP Patent Application No. 07793658.1.

* cited by examiner

FIG. 6

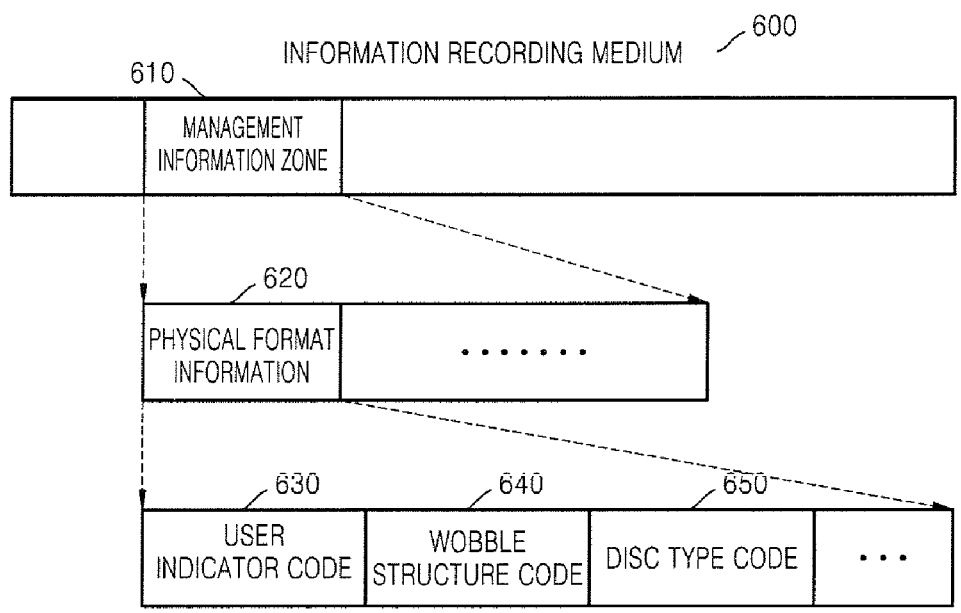

FIG. 7

| Field ID | Contents | Location |
|---|---|---|
| ID0 | ECC block address/Layer Information Code | All areas |
| ID1 | Application code/Physical data/Last address of Data recordable area on Layer0 | Lead in area |
| ID2 | Last address of Data recordable area on Layer 1 | Lead in area |
| ID3 | 1st field of Manufacture ID | Lead in area |
| ID4 | 2nd field of Manufacture ID | Lead in area |
| ID5 | User indicator and Wobble structure (disc variety) | Lead in area |
| ID 6 TO 13 | OPC suggested code/Write strategy code | Lead in area | b7 to b4 : USER INDICATOR CODE
0000 b : COMMERCIAL MODEL
0001 b : CONSUMER MODEL
OTHERS : RESERVED b3 to b0 : WOBBLE STRUCTURE CODE
0000 b : NO WOBBLE
0001 b : 2X WOBBLE (FREQUENCY 280 KHZ)
0010 b : 3X WOBBLE (FREQUENCY 420 KHZ)
0011 b : 4X WOBBLE (FREQUENCY 560 KHZ)
OTHERS : RESERVED

FIG. 9

| b7 | b6 | b5 | b4 | b3 | b2 | b1 | b0 |
|---|---|---|---|---|---|---|---|
| USER INDICATOR CODE | | DISC TYPE CODE | | WOBBLE STRUCTURE CODE | | | |
| 630 | | 650 | | 640 | | | | b7 to b4 : USER INDICATOR CODE
0000 b : COMMERCIAL MODEL
0001 b : CONSUMER MODEL
OTHERS :RESERVED b5 to b4 : DISC TYPE CODE
00 b : WRITE-ONCE
01 b : REWRITABLE DISC
10 b : WRITE-ONCE DISC HAVING LIMITED DATA REPRODUCTION TIME
OTHERS : RESERVED b3 to b0 : WOBBLE STRUCTURE CODE
0000 b : NO WOBBLE
2X WOBBLE (FREQUENCY 280 KHZ)
3X WOBBLE (FREQUENCY 280 KHZ)
4X WOBBLE (FREQUENCY 560 KHZ)
OTHERS : RESERVED

FIG. 10

PHYSICAL FORMAT INFORMATION — 1000

| BP | Contents | Number of bytes |
|---|---|---|
| 0 | Book type and Part version | 1 byte |
| 1 | Disc size and Maximum transfer rate of a disc | 1 byte |
| 2 | Disc structure | 1 byte |
| 3 | Recorded density | 1 byte |
| 4 to 15 | Data area allocation | 12 bytes |
| 16 | NBCA descriptor | 1 byte |
| 17 to 49 | reserved | 33 bytes |
| 50 | Disc indicator/ revision number code | 1 byte — 1100 |
| 51 | User indicator/ Wobble structure | 1 byte — 1200 |
| 52 to 2047 | reserved | 1996 byte |

FIG. 11

DISC INDICATOR/REVISION NUMBER CODE — 1100

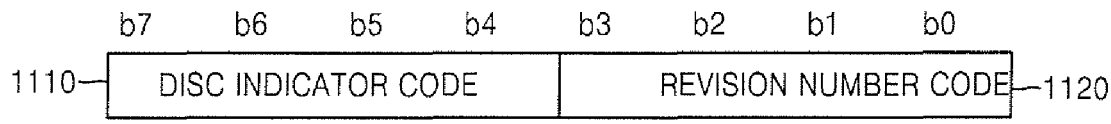

b7 to b4 : DISC INDICATOR CODE
0100 b : DVD-R FOR CSS DOWNLOAD DISC
0101 b : DVD-RW FOR CSS DOWNLOAD DISC
OTHERS : RESERVED b3 to b0 : REVISION NUMBER CODE FOR CSS DOWNLOAD DISC
0000 b : REVISION 1.0
0010 b : REVISION 1.0
0100 b : REVISION 2.0
OTHERS : RESERVED

FIG. 12

USER INDICATOR/WOBBLE STRUCTURE CODE — 1200

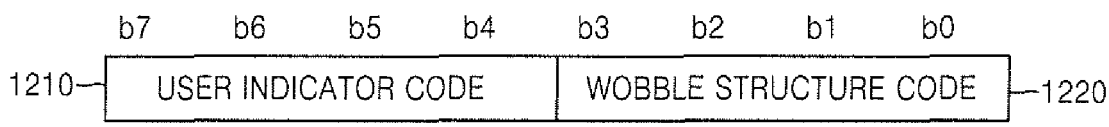

b7 to b4 : USER INDICATOR CODE
0100 b : COMMERCIAL MODEL
0101 b : CONSUMER MODEL
OTHERS : RESERVED b3 to b0 : WOBBLE STRUCTURE CODE
0000 b : : NO WOBBLE (COMMERCIAL MODEL)
0010 b : 2X WOBBLE (FREQUENCY 280 KHZ)
OTHERS : RESERVED

INFORMATION RECORDING MEDIUM AND RECORDING AND/OR REPRODUCING APPARATUS AND METHOD

CROSS-REFERENCE TO RELATED APPLICATIONS

This application is a Continuation of application Ser. No. 11/738,077, filed Apr. 20, 2007, now pending, which claims the benefit of Korean Application No. 2006-84832, filed Sep. 4, 2006 and Korean Patent Application No. 2006-123384, filed Dec. 6, 2006 in the Korean Intellectual Property Office, the disclosures of which are incorporated herein by reference.

BACKGROUND OF THE INVENTION

1. Field of the Invention

Aspects of the present invention relate to an information recording medium and a recording and/or reproducing apparatus and method used to guarantee reproduction compatibility.

2. Description of the Related Art

In general, optical information recording media, such as optical discs, have been widely employed as media to store information which is recorded and reproduced by an optical pickup device in a non-contact manner. Optical discs can be classified as compact discs (CDs) or digital versatile discs (DVDs) according to the information recording capacity of the optical discs. Furthermore, optical discs capable of having information written, erased, and reproduced thereon and therefrom can be sub-divided into a 650 MB compact disc-recordable (CD-R), a compact disc-rewritable (CD-RW), a 4.7 GB digital versatile disc+recordable/rewritable (DVD+R/RW), a digital versatile disc-random access memory (DVD-RAM), and a digital versatile disc-recordable/rewritable (DVD-R/RW). Additionally, an optical disc capable of only having information reproduced therefrom can be divided into a 650 MB CD disc and a 4.7 GB DVD-ROM disc. Furthermore, there is also an optical disc having a recording capacity of 15 GB or more, such as a high-definition (HD) DVD or a blu-ray disc (BD). The development of a Super Rens disc using a super-resolution reproduction technique is also currently being developed.

Led by the music industry, content-providing business markets using the Internet are growing. Movie industries that distribute visual content, such as movies, which have a larger size per unit than music content, such as songs, are also expected to expand in the near future. Unattended information terminal systems provide information to users in a variety of multimedia forms, such as voice audio files, images, graphic videos, text files, and moving pictures in order to allow users to easily and conveniently access and use the information.

For example, a business model is currently being developed for a content-providing business in which a dedicated terminal system such as an unattended information terminal system is installed and a user can copy desired information from the unattended information terminal system onto a DVD-R. In the future, a business model in which information is copied onto a personal computer (PC) drive of a user or a hard disc drive (HDD) mounted DVD recorder of the user, and then copied onto a DVD of the user, will be considered. According to this business model, a disc key is assigned to distributed content in order to manage the copyrighted content of a copied disc.

In this context, the market has placed great importance on reproduction compatibility between the different types of information storage media available to users. In other words, for a disc to comply with the business models described above, the disc must be able to be reproduced in most DVD players and recorders in the market.

SUMMARY OF THE INVENTION

Aspects of the present invention provide an information recording medium and a recording and/or reproducing apparatus and method used to guarantee reproduction compatibility in consideration of the fact that content distribution may be performed according to various business models.

According to an aspect of the present invention, an information recording medium includes a management information zone in which management information is recorded, wherein the management information indicates an intended type of use of the information recording medium.

According to an aspect, the management information includes at least one of user identification information indicating whether the information recording medium is for commercial use or personal use, wobble signal presence information indicating whether a wobble signal is present in a recorded track of the information recording medium, disc type information indicating a disc type of the information recording medium, and a revision code indicating compatibility information of the information recording medium.

According to an aspect, the wobble signal presence information includes information about a frequency of the wobble signal.

According to an aspect, the disc type information includes information indicating whether the information recording medium is a write-once optical disc, a rewritable optical disc, or an optical disc having limited data reproduction time.

According to an aspect, the disc type information includes information indicating whether the information recording medium is a digital versatile disc-recordable (DVD-R) for a content scramble system (CSS) download disc or a digital versatile disc-rewritable (DVD-RW) for a CSS download disc.

According to an aspect, the management information zone is arranged in the form of land prepits of the information recording medium or is located in a control data zone of the information recording medium.

According to an aspect, the management information is used to indicate whether the information recording medium is compatible with a business model in which content is distributed using a personal recording and/or reproducing apparatus or a business model in which the content is distributed using a dedicated commercial recording and/or reproducing apparatus.

According to another aspect of the present invention, an information recording medium includes a control data zone, wherein the control data zone includes physical format information indicating an intended type of use of the information recording medium, and the physical format information includes at least one of first information having a disc indicator code indicating a disc type of the information recording medium or a revision number code indicating a compatibility version of the information recording medium, or second information having a user indicator code indicating whether the information recording medium is for commercial use or personal use, or a wobble structure code indicating whether a wobble signal is present in a recorded track of the information recording medium.

According to another aspect, the physical format information indicates whether the information recording medium is compatible with a business model in which content is distributed using a personal recording and/or reproducing apparatus or a business model in which the content is distributed using a dedicated commercial recording and/or reproducing apparatus.

According to another aspect of the present invention, a recording and/or reproducing apparatus records data on and/or reproduces data from an information recording medium, and includes a recording and/or reproducing unit to record data to and/or reproduce data from the information recording medium and a control unit to control the recording and/or reproducing unit to reproduce management information indicating an intended type of use of the information recording medium from the information recording medium and to record data in the information recording medium according to the reproduced management information.

According to another aspect of the present invention, a recording and/or reproducing method in which data is recorded to and/or reproduced from an information recording medium includes reproducing management information from the information recording medium to determine an intended type of use of the information recording medium from the information recording medium, and recording and/or reproducing data to and/or from the information recording medium according to the reproduced management information.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 illustrates an information recording medium having recorded thereon management information according to an embodiment of the present invention;

FIG. 7 illustrates an example of physical format information illustrated in FIG. 6;

FIG. 9 illustrates another example of ID5 illustrated in FIG. 7;

FIG. 10 illustrates another example of the physical format information illustrated in FIG. 6;

FIG. 11 illustrates the structure of the disc indicator/revision number code illustrated in FIG. 10;

FIG. 12 illustrates the structure of the user indicator/wobble structure code illustrated in FIG. 10;

DETAILED DESCRIPTION OF THE EMBODIMENT

Figure 1:
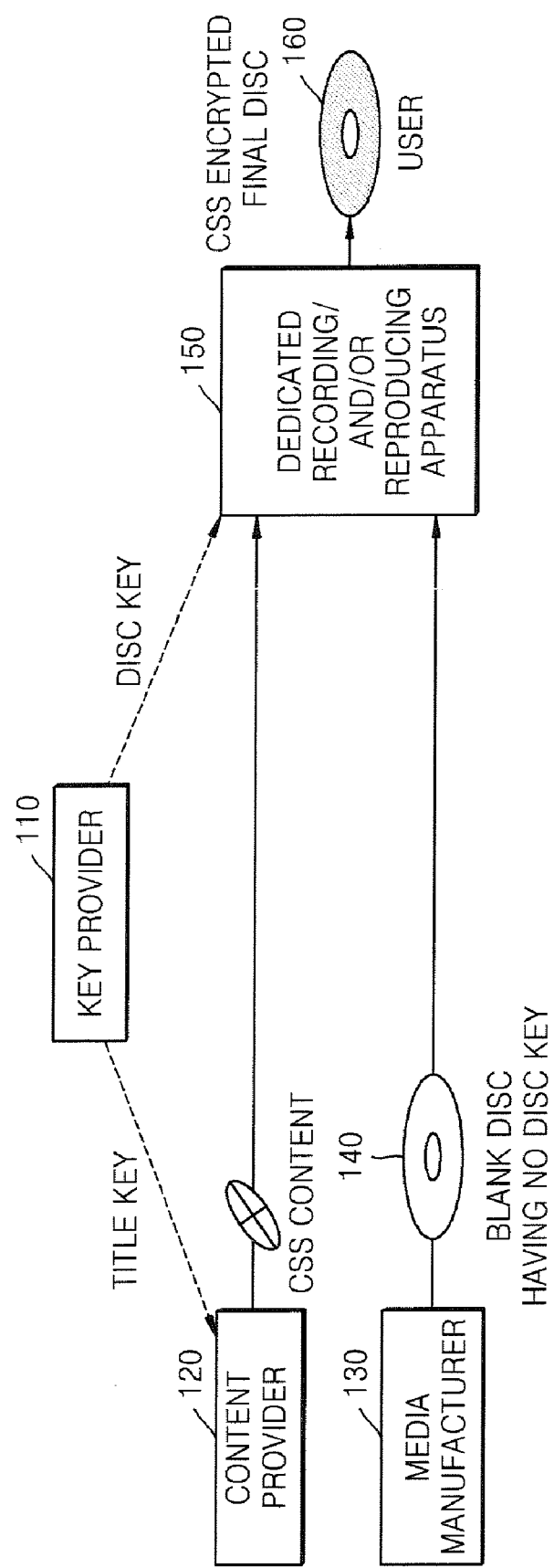
FIG. 1 illustrates a business model in which content is distributed using a dedicated commercial recording and/or reproducing apparatus.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 illustrates a business model in which content is distributed using a dedicated commercial recording and/or reproducing apparatus 150. Referring to FIG. 1, a key provider 110 distributes a key to protect copyrighted content. The key provider 110 distributes a title key to a content provider 120 and a disc key to the dedicated commercial recording and/or reproducing apparatus 150. The key provider 120 may, for example, be the DVD copy control association (DVD CCA). The content provider 120 encrypts the content to be transmitted using the title key in order to generate content scramble system (CSS) content and then transmits the generated CSS content to the dedicated commercial recording and/or reproducing apparatus 150. The CSS is a protection system used by content owners to enable consumers to legally access high-quality DVD movies and TV programs, thus preventing illicit copying of content and protecting the content from copyright infringement. A media manufacturer 130 provides a blank disc 140 having no disc key to the dedicated commercial recording and/or reproducing apparatus 150. The dedicated commercial recording and/or reproducing apparatus 150 then records the CSS content transmitted from the content provider 120 on the blank disc 140 using the disc key provided from the key provider 110 and outputs the disc 160 having the CSS content recorded thereon, i.e., a CSS-encrypted final disc 160 to a user.

Figure 2:
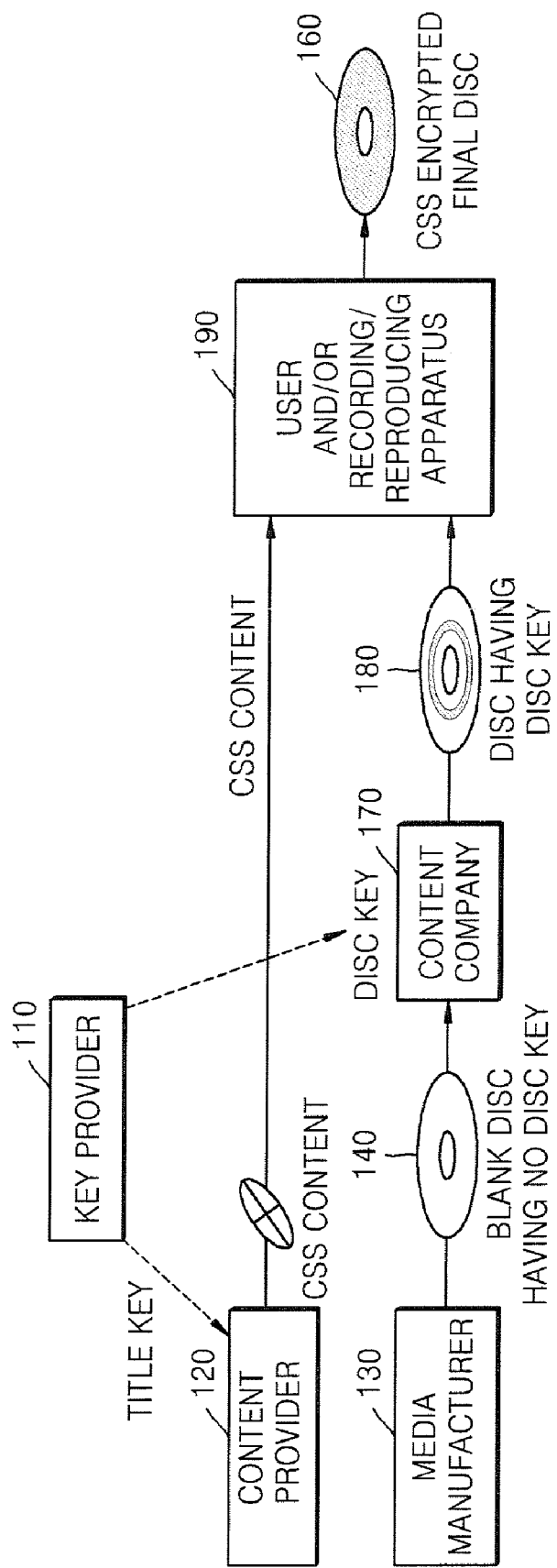
FIG. 2 illustrates a business model in which content is distributed using a personal recording and/or reproducing apparatus of a user.

FIG. 2 illustrates a business model in which content is distributed using a personal recording and/or reproducing apparatus 190 of a user. Referring to FIG. 2, the key provider 110 provides a title key to the content provider 120 and a disc key to the personal recording and/or reproducing apparatus 190 of the user. The content provider 120 encrypts the content to be transmitted using the title key in order to generate CSS content and then transmits the generated CSS content to the personal recording and/or reproducing apparatus 190 of the user. The media manufacturer 130 provides a blank disc 140 having no disc key to the content company 170. The content company 170 generates a disc 180 having a disc key from the blank disc 140 using the disc key provided from the key provider 110 and outputs the disc 180 to the user. The user purchases the disc 180 having a disc key and loads the disc 180 into the personal recording and/or reproducing apparatus 190 of the user. The personal recording and/or reproducing apparatus 190 of the user then records the CSS content transmitted from the content provider 120 onto the loaded disc 180 having a disc key, and outputs the disc 160 having the CSS content recorded thereon, i.e., the CSS-encrypted final disc 160, to the user.

Discs 160 complying with the above-described business models already exist in the market. In order to prevent confusion for users, identification information indicating which business model a disc 160 is suited for has to be recorded on the disc 160.

Figure 3:
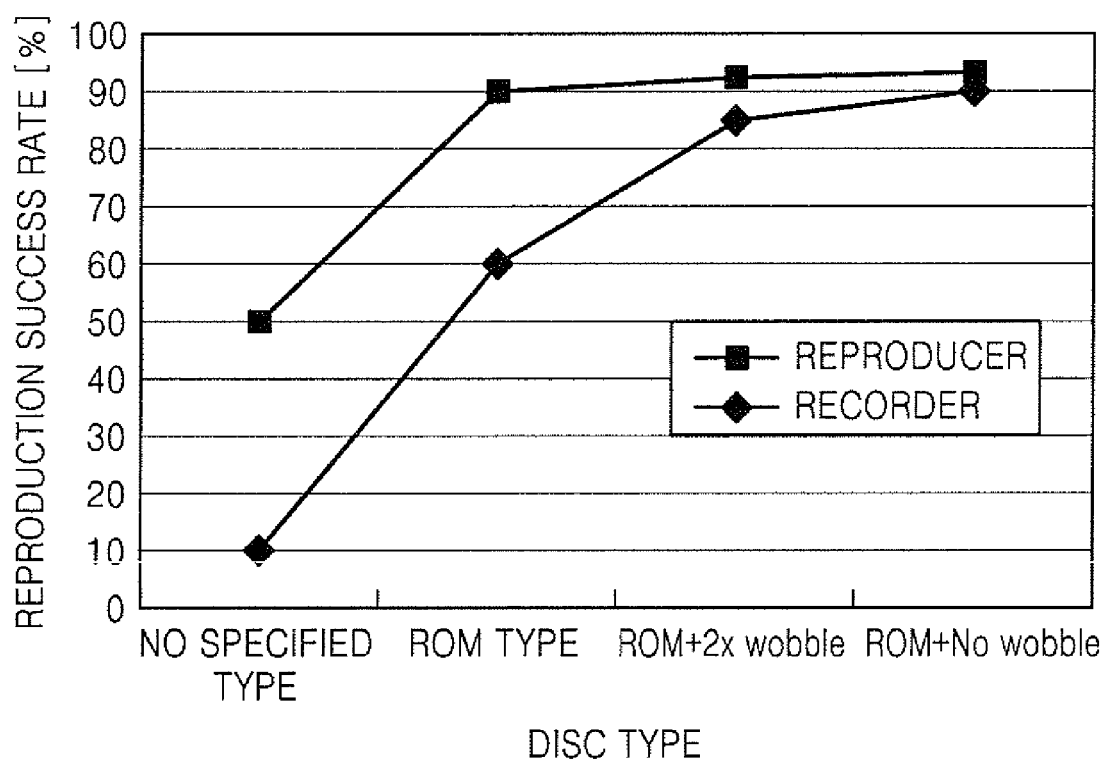
FIG. 3 is a graph showing a reproduction success rate in a digital versatile disc (DVD) player with respect to the structure of a disc.

FIG. 3 is a graph showing a reproduction success rate in a DVD player with respect to the structure of the disc 160. As shown in the graph of FIG. 3, one of the most effective ways to improve the reproduction success rate is to set book type information in a disc management zone of the disc 160 indicating that the disc 160 is a digital versatile disc read-only memory (DVD-ROM). When a DVD player in the market recognizes the disc 160 as a DVD-ROM, a reproduction success rate is improved compared to when the DVD player recognizes the disc 160 as a normal disc. It can be seen from FIG. 3 that a reproduction success rate in a normal disc 160 is 50%, while a reproduction success rate in a disc 160 having book type information recorded into the disc management zone indicating that the disc 160 is a ROM type disc 160 is 90%.

Figure 4:
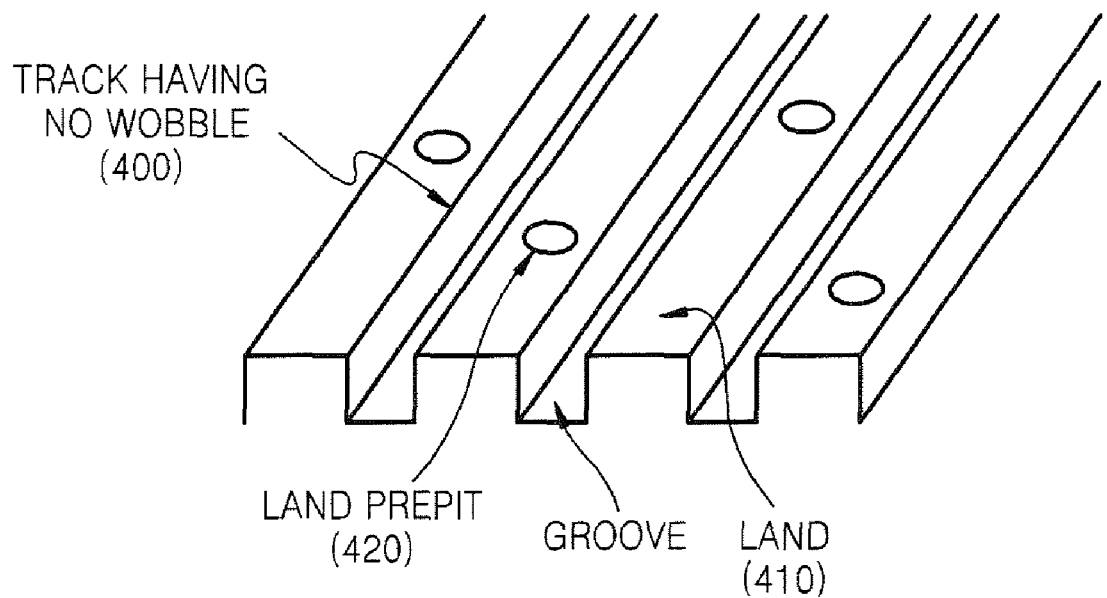
FIG. 4 illustrates a track having no wobble in an optical disc.
Figure 5:
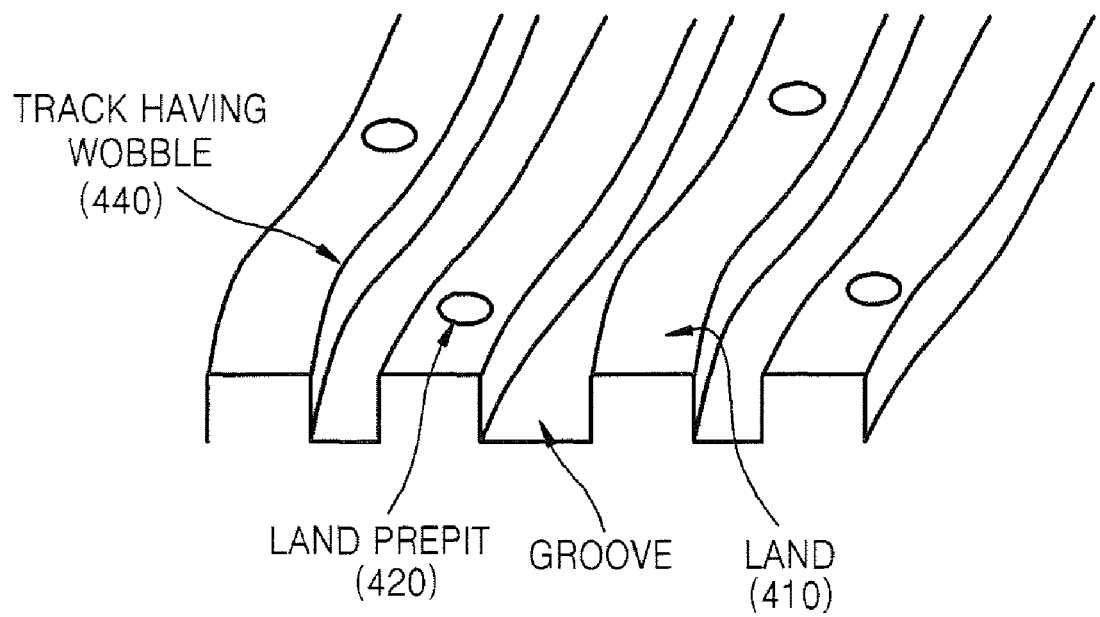
FIG. 5 illustrates a track having a wobble in an optical disc.

A track having no wobble 400 and a track having a wobble 440 in the optical disc 160 will now be respectively described with reference to FIGS. 4 and 5. Referring to FIG. 5, a recording track 400 (a "groove") meanders according to a predetermined frequency, i.e., has a wobble, and a land 410 between tracks 400 includes an address pit called a land prepit (LPP) 420. Using two LLPs 420, information required to control disc rotation during recording, to generate a recording clock, and to record data such as a recording address, may be obtained. FIG. 4 illustrates a track having no wobble 400 in the optical disc 160. In the track having no wobble 400, frequency information that has to be contained in a wobble may be included in the LPPs 420.

In order to initially recognize the physical structure of the disc 160, a DVD recorder recognizes the disc 160 as a DVD-R or a DVD-RW at the time of sensing a wobble, the wobble indicating a wave at a predetermined frequency in a recording groove. If book type information in the management zone which is reproduced by the DVD recorder shows that the disc 160 is a DVD-ROM, an error may occur due to a difference between the reproduced book type information and the recognized information. To solve this problem, the frequency of the wobble may be changed, for example, into double the frequency (2×) of a DVD-R/RW, or a recording groove having no wobble 400 may be formed. With the change of the physical characteristics of a wobble, the reproduction success rate of the DVD recorder is improved. It can be seen from FIG. 3 that a reproduction success rate in the 2× wobble ROM is over 90% and a reproduction success rate in the ROM having no wobble is also over 90%.

However, in a disc 160 having no wobble signal for controlling disc rotation speed, constant angular velocity ("CAV") control, in which the number of rotations of the disc 160 is fixed, has been suggested. As a result of CAV control, design flexibility for a recorder is limited and high precision of the recorder cannot be expected. On the other hand, a disc 160 having a wobble frequency has a low reproduction success rate. To solve both of these problems, the recorder needs to distinguish and then adapt to the two types of discs 160.

In an optical disc 160 such as a DVD-R or a DVD-RW, data is recorded in a management zone along the inner circumference of the optical disc 160. However, when a dedicated commercial recording and/or reproducing apparatus 150 (FIG. 1), such as a kiosk, downloads content, a recorder records data in a pre-written control zone along the inner circumference of the disc 160 after recording data in a data zone of the disc 160. As a result, management information, such as information describing recording conditions, is stored in an LPP. In the case of personal use, a user records data in a disc 160 that is pre-recorded by a content company using a user recording and/or reproducing apparatus 190 (FIG. 2), and management information is stored in an LPP.

Conventionally, a wobble signal obtained from a wobbled groove at a predetermined frequency, e.g., 140 kHz, in a track of the disc 160 serves as the original signal of a reference clock signal used during recording performed by a conventional recorder. The wobble signal is thus used to control disc rotation. An LPP 420 is structured such that a pit portion in a land 410 of the disc 160 is positioned at the head of 8 wobble periods or second or third from the head of the 8 wobble periods and at the peak of the amplitude. Thus, the LPP contains address information or recording condition information of the disc 160, which has to be read by the conventional recorder.

In other words, when the conventional recorder records data onto the disc 160, a wobble is an important feature. However, importance must be given to reproduction compatibility in order to consider the two business models shown in FIGS. 1 and 2 and described above. When the disc 160 is a DVD, to increase reproduction compatibility, it is preferable to set the type of DVD, indicated by book type information included in a control data zone along the inner circumference of the disc 160, as a DVD-ROM. By setting the type of a disc 160 as a DVD-ROM, the compatibility of the DVD with a reproduction-only apparatus improves, but the compatibility with a recorder may not be necessarily improved if the discs 160 are not actually DVD-ROMs. In other words, if the disc 160 is a DVD-R or a DVD-RW, and the book type of the DVD is set as a DVD-ROM instead of a DVD-R or a DVD-RW, the recorder may recognize the DVD as a defective disc. When this occurs, the recorder will not be able to reproduce the DVD because DVD-Rs and DVD-RWs each have a wobble, while a DVD-ROM has no wobble and has only pits. To address this problem, a wobble may be removed or the basic frequency of a wobble may be changed.

When a wobble is removed, an LPP signal is used and thus a high-precision disc 160 and a high-precision reproduction control technique of a recorder are required. The application of the high-precision reproduction control technique is feasible in a commercial model. However, in a home model, such as a PC, it is desirable to use a disc 160 with a wobble when considering a problem in terms of cost or deviation in quality between discs 160 due to a large number of discs 160. Thus, it is desirable to distinguish discs 160 into discs 160 for commercial use and discs 160 for personal use.

FIG. 6 illustrates an information recording medium 600 having recorded thereon management information according to an embodiment of the present invention. Referring to FIG. 6, the information recording medium 600 provides a management information zone 610 to record management information. The information recording medium 600 includes physical format information 620 as one part of the management information recorded in the management information zone 610. According to an aspect of the present invention, the physical format information 620 includes a user indicator code 630, a wobble structure code 640, and a disc type code 650. However, the physical format information 620 is not required to include each of the three codes described above, and may instead include at least one of the user indicator code 630, the wobble structure code 640, and the disc type code 650 without being limited to the example illustrated in FIG. 6. Additionally, the management information is not required to be recorded in the management information zone 610.

The user indicator code 630 is information indicating the intended type of use of the information recording medium 600. For example, the user indicator code 630 may be information indicating whether the information recording medium 600 is used for commercial use or personal use. It is understood that the user indicator code may also be used to indicate other types of intended uses, such as use for a research lab or a private network.

The wobble structure code 640 is information indicating a structure applied to the information recording medium 600. For example, the wobble structure code 640 includes information indicating whether the disc structure has a wobble, and further includes information indicating the wobble frequency if the disc structure has a wobble.

The disc type code 650 is information indicating the type of the information recording medium 600. Hereinafter, the terms "information recording medium 600" and "disc 160" are used synonymously with each other. For example, the disc type code 650 includes information indicating whether the information recording medium 600 is a write-once disc 160 or a rewritable disc 160 and further includes information indicating whether the information stored on the information recording medium 600 may be reproduced for only a predetermined time after data is recorded onto the information recording medium 600.

FIG. 7 illustrates an example of the physical format information 620 illustrated in FIG. 6. The physical format information 620 is stored in the form of an LPP. Referring to FIG. 7, an LPP data block is divided into areas defined by field IDs. Information corresponding to ID0 exists over all areas and information corresponding to ID1 through ID3 is repetitively stored in a lead-in area near the inner circumference of the disc 160 in a user data area. In each field ID, relative addresses within the same field ID are included in bit positions 1, 2, 3 and 4, and other information is included in bit positions 5, 6, 7, 8, 9, 10, 11 and 12. In this structure, a user indicator code and a wobble structure (disc type) code, which are collectively management information according to an aspect of the present invention, are included in ID5. Although the management information according to an aspect of the present invention is included in ID5 in FIG. 7, it is understood that the management information may be contained in any position that allows compatibility with a conventional information format.

Figure 8:
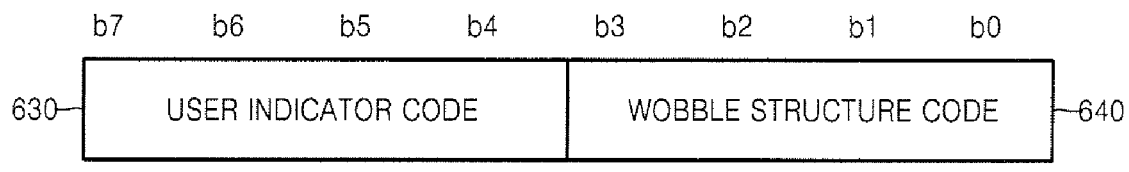
FIG. 8 illustrates an example of ID5 illustrated in FIG. 7.

FIG. 8 illustrates an example of ID5 illustrated in FIG. 7. Referring to FIG. 8, ID5 includes a user indicator code 630 ranging from b4 to b7 and a wobble structure code 640 ranging from b0 to b3. For the user indicator code 630, '0000' indicates a commercial model, '0001' indicates a consumer model, and other bits serve as reserved areas. Also, for the wobble structure code 640, '0000' indicates a structure having no wobble, '0001' indicates a 2× wobble structure with a wobble frequency of 280 kHz, '0010' indicates a 3× wobble structure with a wobble frequency of 420 kHz, '0011' indicates a 4× wobble structure with a wobble frequency of 560 kHz, and other bits serve as reserved areas. It is understood that other frequencies of wobbles may also be used.

FIG. 9 illustrates another example of ID5 illustrated in FIG. 7. Referring to FIG. 9, ID5 includes the user indicator code 630 ranging from b6 to b7, a disc type code 650 ranging from b4 to b5, and the wobble structure code 640 ranging from b0 to b3. For the user indicator code 630, '0000' indicates a commercial model, '0001' indicates a consumer model, and other bits serve as reserved areas. Also, for the disc type code 650, '00' indicates a write-once disc, '01' indicates a rewritable disc, '10' indicates a write-once disc having limited data reproduction time, and other bits serve as reserved areas. Furthermore, for the wobble structure code 640, '0000' indicates a structure having no wobble, '0001' indicates a 2× wobble structure with a wobble frequency of 280 kHz, '0010' indicates a 3× wobble structure with a wobble frequency of 420 kHz, '0011' indicates a 4× wobble structure with a wobble frequency of 560 kHz, and other bits serve as reserved areas. It is understood that the user indicator code 630, wobble structure code 640 and disc type code 650 may have different values than those shown in FIGS. 8 and 9 and described above.

FIG. 10 illustrates another example of the physical format information 1000 illustrated in FIG. 6. An area in which management information of a disc 160 is stored, called a control data zone, is located in a lead-in area of the disc 160. The physical format information 1000 illustrated in FIG. 10 is recorded in the control data zone. In the case of a DVD-R, the physical format information 1000 is called pre-recorded physical format information. In the case of a DVD-RW, the physical format information 1000 is called embossed physical format information. In the lead-in area of the conventional DVD-R or DVD-RW, the management information of the disc 160 may be recorded in an R-physical format information area as well as the control data zone. The physical format information 1000 may also be recorded in the R-physical format information area, and other areas of the information recording medium as well.

Referring to FIG. 10, in the physical format information 1000, common contents of all DVD formats are generally stored in byte position (BP) 0 through BP31, and individual content of each specific DVD format starts being stored at BP32. According to an aspect of the present invention, unique disc information about a downloaded DVD is stored in BP50 and BP51 that are not used by the DVD formats. Here, the term "downloaded DVD" refers to a DVD having contents downloaded from a network recorded thereon. In other words, a disc indicator/revision number code 1100 may be recorded in BP50 and a user indicator/wobble structure code 1200 may be recorded in BP51, as will be described later with reference to FIGS. 11 and 12. However, it is understood that the disc indicator/revision number code 1100 is not required to be recorded in BP50, and the user indicator/wobble structure code 1200 is not required to be recorded in BP51.

Since the LPP data block illustrated in FIG. 7 is recorded in the disc 160 in the form of an LPP, disc information can be obtained by reading the LPP data block even when the optical disc 160 does not have a control data zone. However, an LPP data block cannot be read from a DVD-ROM due to differences between track structures, and when a recorder corresponding to a DVD-R or DVD-RW fails to reproduce an LPP, the disc 160 cannot be recognized. Thus, by recording disc information in control data zones that exist in all DVDs, a reproducer or a recorder can easily reproduce the physical format information 1000.

FIG. 11 illustrates an example of the structure of the disc indicator/revision number code 1100, also known as first information, illustrated in FIG. 10. Referring to FIG. 11, a disc indicator code 1110, also known as a first value, uses bit positions b4 through b7 in order to identify the disc 160. For example, '0100' indicates a DVD-R for a CSS download disc, '0101' indicates a DVD-RW for a CSS download disc, and other bits serve as reserved areas. However, it is understood that bit '0100' is not limited to indicating a DVD-R for a CSS download disc, bit '0101' is not limited to indicating a DVD-RW for a CSS download disc, and the other bits are not limited to serving as reserved areas.

A revision number code 1120 uses bit positions b0 through b3 in order to indicate recording compatibility. For example, '0000' indicates revision 0.0, '0010' indicates revision 1.0, '0100' indicates revision 2.0, and other bits serve as reserved areas. However, it is understood that bit '0000' is not limited to indicating revision 0.0, bit '0010' is not limited to indicating revision 1.0, but '0100' is not limited to indicating revision 2.0, and the other bits are not limited to serving as reserved areas.

In a conventional format, compatibility information has been managed as a book type in BP0 and a part version. In the compatibility information for a downloaded disc 160 according to aspects of the present invention, a disc indicator code corresponding to the book type is defined and a revision number code corresponding to the part version is defined. Thus, the revision number code indicates recording compatibility, and a recorder corresponding to revision 1.0 cannot record data in a disc 160 corresponding to revision 2.0. According to the example shown in FIG. 11, revision 1.0 is set as a single layer disc version having a single recording layer and revision 2.0 is set as a dual layer disc version having two recording layers. Therefore, even when recording compatibility cannot be guaranteed due to developments in the format of a downloadable DVD, a recorder can identify a disc 160 by changing a revision code.

FIG. 12 illustrates an example of the structure of the user indicator code/wobble structure code 1200, also known as second information, illustrated in FIG. 10. Referring to FIG. 12, the user indicator/wobble structure code 1200 includes a user indicator code 1210 ranging from b4 to b7 and a wobble structure code 1220 ranging from b0 to b3. According to the example shown in FIG. 12, for the user indicator code 1210, '0000' indicates a commercial model, '0010' indicates a consumer model, and other bits serve as reserved areas. Also, for the wobble structure code 1220, '0000' indicates a structure having no wobble, '0010' indicates a 2× wobble structure with a wobble frequency of 280 kHz, and other bits serve as reserved areas. However, it is understood that the user indicator code 1210 is not limited to the format of the example shown in FIG. 12.

Figure 13:
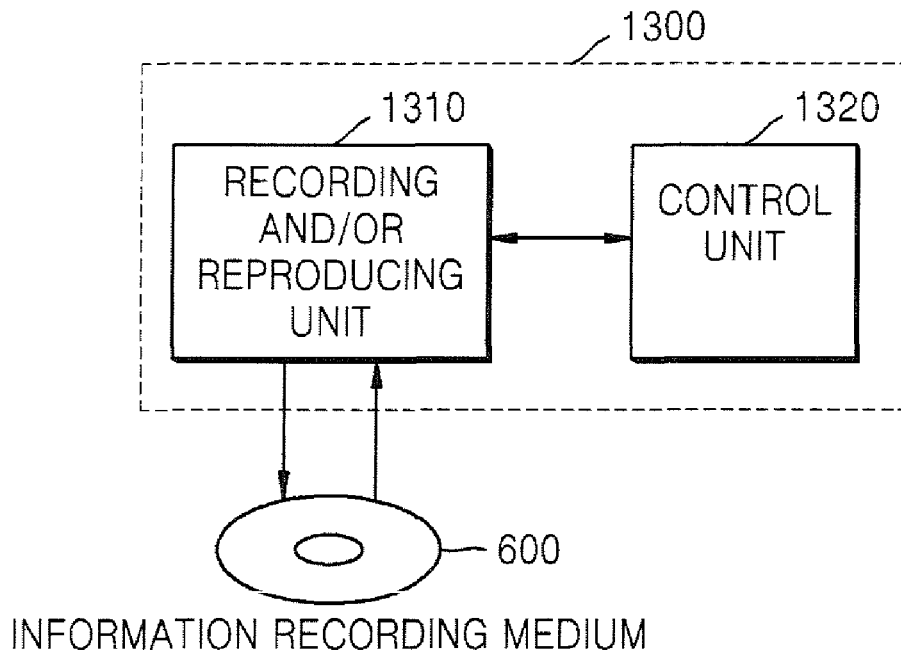
FIG. 13 illustrates a recording and/or reproducing apparatus using an information recording medium according to an embodiment of the present invention.

FIG. 13 illustrates a recording and/or reproducing apparatus 1300 which uses the information recording medium 600. Referring to FIG. 13, the recording and/or reproducing apparatus 1300 records data in the information recording medium 600 in which management information according to aspects of the present invention is recorded, and/or reproduces data from the information recording medium 600. To record and/or reproduce data to and/or from the information recording medium 600, the recording and/or reproducing apparatus 1300 includes a recording and/or reproducing unit 1310 and a control unit 1320.

The recording and/or reproducing unit 1310 records data to and/or reproduces data from the information recording medium 600 according to the control of the control unit 1320. The control unit 1320 controls the recording and/or reproducing unit 1310 to record and/or reproduce data, and also processes data to be recorded to the information recording medium 600 and data that has been reproduced from the information recording medium 600.

In particular, the control unit 1320 according to an aspect of the present invention controls the recording and/or reproducing unit 1310 to reproduce the physical format information 620 from the management information zone 610 of the information recording medium 600 and to receive the reproduced physical format information 620 from the recording and/or reproducing unit 1310. The control unit 1320 controls recording in the information recording medium 600 based on the reproduced physical format information 620. In other words, the control unit 1320 controls the recording and/or reproducing unit 1310 such that data can be recorded to the information recording medium 600 according to the use type or the physical structure of the information recording medium 600, based on the management information included in the physical format information 620.

More specifically, the control unit 1320 manages recording according to the management information included in the physical format information 620 as follows. Referring to FIG. 8, the user indicator code 640 includes information indicating whether the information recording medium 600 is intended to be used with a commercial model, such as a kiosk, or a consumer model, such as a PC. The control unit 1320 recognizes the user indicator code 640 and manages data recording according to the user indicator code 640. In other words, when the user indicator code 640 of the loaded information recording medium 600 is not suitable for the recording and/or reproducing apparatus 1300, the control unit 1320 performs a control operation which prevents recording from being performed. At this point, the recording and/or reproducing apparatus 1300 can perform various different commands, such as, for example, ejecting the information recording medium 600 or displaying an error message.

For example, when a user mistakenly inserts an information recording medium 600, which is intended to be used in a commercial model and which has commercial model information recorded therein, into a recording and/or reproducing apparatus 1300 which is a consumer model, the control unit 1320 recognizes the user indicator code 640 indicating that the information recording medium 600 is intended to be used with the commercial model. In this case, instead of attempting to record data to the information recording medium 600, the control unit 1320 prevents recording, and may eject the information recording medium 600 or display a message indicating that the inserted information recording medium 600 is not intended for consumer use.

The control unit 1320 recognizes whether the information recording medium 600 has a structure having a wobble and further recognizes a wobble frequency if the information recording medium 600 has a structure having a wobble. Specifically, if the information recording medium 600 has a wobble, the control unit 1320 recognizes the wobble frequency based on the wobble structure code 640 (FIG. 6) of the physical format information 620 reproduced from the information recording medium 600. By inserting various basic wobble frequencies in the wobble structure code 640, it is possible to prevent data from being erroneously recorded in a later developed non-compatible disc when the later-developed disc is loaded in a conventional device. In other words, the control unit 1320 recognizes the wobble structure code 640 reproduced from the information recording medium 600, controls the recording and/or reproducing unit 1310 to record data when the wobble structure set in the wobble structure code 640 is a wobble structure that can be supported by the recording and/or reproducing apparatus 1300, and performs a control operation to prevent recording to the disc 160 when the wobble structure is a wobble structure that cannot be supported by the recording/reproducing apparatus 1300. For example, the control unit 1320 can eject the information recording medium 600 or display an error message to the user.

For example, when a high-definition (HD) disc, which performs high-resolution recording and which is not compatible with certain recording and/or reproducing apparatuses, is manufactured and used, the incompatible recording and/or reproducing apparatus, which may be, for example, capable of recording data in a 2× wobble frequency disc, does not record data in the HD disc. In this case, when the HD disc has the same frequency wobble structure as the 2× wobble frequency disc, i.e., the 2× wobble structure, the recording and/or reproducing apparatus recognizes the HD disc as the same type as the 2× wobble frequency disc and records data in the HD disc. Thus, by changing the wobble frequency of the HD disc into a 3× wobble frequency, the recording and/or reproducing apparatus can recognize the HD disc as having a frequency that cannot be supported by the recording and/or reproducing apparatus and will eject the HD disc or display an error message to the user to stop recording.

The control unit 1320 recognizes whether the information recording medium 600 is a write-once disc, a rewritable disc, or a disc having limited data reproduction time based on the disc type code 650 of the physical format information 620 reproduced from the information recording medium 600.

During recording, the control unit 1320 overwrites a user data zone of the disc 160 when the disc 160 is a rewritable disc. If the disc 160 is a write-once disc, the control unit 1320 ejects the disc without performing the overwrite operation. If the disc 160 is a rewritable disc, the control unit 1320 records data in a control data zone. However, when the disc 160 is a rewritable disc, a disc manufacturer performs pre-emboss processing on the disc in order to prevent the control data zone of the disc from being rewritten according to a general intention of a user. Thus, when the control data zone is provided in the form of an LLP, the book type is set as a DVD-ROM and the recording and/or reproducing apparatus 1300 cannot write data into the control data zone.

During reproduction, the operation of the control unit 1320 does not differ according to whether the loaded disc 160 is a write-once disc or a rewritable disc. However, since a rewritable disc such as a DVD-ROM uses a metal film, its reflectivity is generally lower than the reflectivity of a write-once disc such as a DVD-R. Thus, the reproduction success rate of the rewritable disc is lower than the reproduction success rate of a write-once disc, such as a DVD-R, which uses a pigment material.

According to an aspect of the present invention, when the loaded disc 160 is a disc having limited data reproduction time, the control unit 1320 prevents the disc from being oxidized by packing the disc in a vacuum after data recording. For example, in the case of a disc having data that can be reproduced for only 48 hours, the transmissivity of PC resin used in a DVD degrades after 48 hours and thus data of the disc cannot be reproduced any more. Since data of this type of disc cannot be reproduced after 48 hours, the user may regard the disc as having an error. Thus, when the loaded disc 160 is a disc having limited data reproduction time, the control unit 1320 displays a message to the user indicating that downloaded content cannot be reproduced after 48 hours.

Although the physical format information 620 illustrated in FIG. 7 is taken as an example of information used to describe the structure and operation of the recording and/or reproducing apparatus 1300, it can be easily understood by those skilled in the art that the physical format information 1000 illustrated in FIG. 10 may also be used in the same manner as the physical format information 620 illustrated in FIG. 7.

Figure 14:
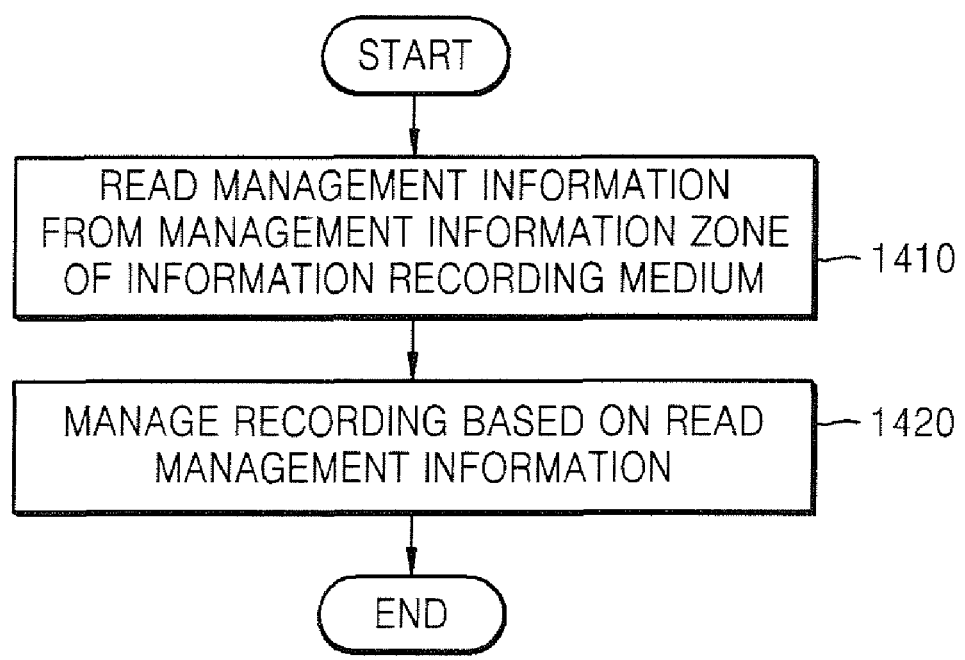
FIG. 14 is a flowchart illustrating a recording and/or reproducing method according to an embodiment of the present invention.

FIG. 14 is a flowchart illustrating a recording and/or reproducing method according to an embodiment of the present invention. Referring to FIG. 14, the control unit 1320 of the recording and/or reproducing apparatus 1300 controls the recording and/or reproducing unit 1310 to reproduce management information from the management information zone of the information recording medium 600. Specifically, in operation 1410, the control unit 1320 controls the recording and/or reproducing unit 1310 to reproduce the management information from the management information zone of the information recording medium 600 and transmit the reproduced management information to the control unit 1320.

Then, in operation 1420 the control unit 1320 recognizes setting contents of the reproduced management information and manages the recording operation of the recording and/or reproducing apparatus 1300 according to the recognized contents in operation 1420. In other words, when the recognized contents indicate that the information storage medium 600 is compatible with the recording and/or reproducing apparatus 1300, the control unit 1320 controls the recording and/or reproducing unit 1310 to record and/or reproduce data to and/or from the information recording medium 600. When the recognized contents indicate that the information storage medium 600 is not compatible with the recording and/or reproducing apparatus 1300, the control unit 1320 prevents recording and/or reproducing to the information storage medium 600, and may eject the information recording medium 600 and/or display an error message indicating that the information recording medium 600 cannot be used in the recording and/or reproducing apparatus 1300.

It is further understood that a recording and/or reproducing method according to aspects of the present invention can be embodied as code that is readable by a computer on a computer-readable recording medium. The computer-readable recording medium includes all kinds of recording devices capable of storing data that is readable by a computer system. Examples of the computer-readable recording medium include read-only memory (ROM), random access memory (RAM), CD-ROMs, magnetic tapes, floppy disks, optical data storage devices, and carrier waves such as transmission over the Internet. The computer readable recording medium can also be distributed over network coupled computer systems so that the computer readable code is stored and executed in a distributed fashion. Also, functional programs, code, and code segments to implement aspects of the present invention can be easily construed by programmers skilled in the art.

As described above, aspects of the present invention guarantee reproduction compatibility between various types of discs which are being developed in the market, as various business models associated with content distribution are concurrently being developed.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A recording and/or reproducing method to record data on and/or reproduce data from an information recording medium, the recording and/or reproducing method comprising:

reproducing physical format information from the information recording medium; and recording data in the information recording medium according to the physical format information, wherein the physical format information comprises a disc indicator including a plurality of values indicating a type of the information recording medium, and when the disc indicator is a first value, the disc indicator indicates that the information recording medium is a DVD disc for recording a content encoded using content scramble system (CSS).

2. The recording and/or reproducing method of claim 1, wherein the disc indicator further indicates whether the recording medium is a digital versatile disc-rewritable (DVD-RW) for a CSS download disc.

3. The recording and/or reproducing method of claim 1, wherein the physical formation information is included in a lead-in area of the recording medium.

4. The recording and/or reproducing method of claim 1, wherein the disc indicator further comprises a second value to identify a reserve area.

5. The recording and/or reproducing method of claim 1, wherein the physical formation information further comprises a revision indicator that indicates a version of data stored in the recording medium.

6. The recording and/or reproducing method of claim 5, wherein the revision indicator is used to determine compatibility of the data stored in the recording medium.

7. The recording and/or reproducing method of claim 5, wherein the disc indicator comprises a disc indicator number code; and the revision indicator comprises a revision indicator number code.

8. A recording and/or reproducing method that records data on and/or reproduces data from an information recording medium, the recording and/or reproducing method comprising:
   reproducing physical format information from the information recording medium to determine a type of the information recording medium; and
   recording and/or reproducing data to and/or from the information recording medium according to the reproduced physical format information,
   wherein the physical format information comprises a disc indicator including a plurality of values indicating the type of the information recording medium,
   when the disc indicator is a first value, the disc indicator indicates that the information recording medium is a DVD disc for recording a content encoded using content scramble system (CSS).

9. The recording and/or reproducing method of claim 8, wherein the reproducing of the physical format information comprises recognizing at least one of:
   user identification information indicating whether the information recording medium is for commercial use or personal use;
   wobble signal presence information indicating whether a wobble signal is present in a recorded track of the information recording medium;
   disc type information indicating a disc type of the information storage medium; and
   a revision code indicating compatibility information of the information recording medium.

10. The recording and/or reproducing method of claim 9, wherein the wobble signal presence information comprises information about a frequency of the wobble signal.

11. The recording and/or reproducing method of claim 9, wherein the disc type information comprises information indicating whether the information recording medium is a write-once optical disc, a rewritable optical disc, or an optical disc having a limited data reproduction time.

12. The recording and/or reproducing method of claim 9, wherein the disc type information comprises information indicating whether the information recording medium is a digital versatile disc-rewritable (DVD-RW) on which the downloaded content is recorded using the CSS.

13. The recording and/or reproducing method of claim 8, wherein the recording and/or reproducing of the data comprises recording and/or reproducing the data to and/or from the information storage medium when the physical format information indicates that the information storage medium is supported by a recording and/or reproducing apparatus and ejecting the information recording medium or displaying an error message when the physical format information indicates that the information storage medium is not supported by the recording and/or reproducing apparatus.

14. The recording and/or reproducing method of claim 8, wherein the physical format information indicates whether the information recording medium is used for a business model in which contents are distributed using a personal recording and/or reproducing apparatus or a business model in which contents are distributed using a dedicated commercial recording and/or reproducing apparatus.

* * * * *